Patented Dec. 26, 1950

2,535,385

UNITED STATES PATENT OFFICE 2,535,385

DIRIBOFLAVIN ESTER OF PYROPHOSPHORIC ACID AND ITS PREPARATION

Philip J. Breivogel, Glen Ridge, N. J., assignor to White Laboratories, Incorporated, Newark, N. J., a corporation of New Jersey No Drawing. Application January 9, 1947, Serial No. 721,159

16 Claims. (Cl. 260—211.3)

This invention relates to a novel process for the preparation of phosphoric acid esters of polyhydroxyalkyl-isoalloxazines, and more specifically to a process for the phosphorylation of riboflavin and to the phosphorylated riboflavin obtained.

The phosphoric acid esters of riboflavin are of importance inasmuch as it has been shown that in the utilization of riboflavin (vitamin $B_2$) by body tissues, the riboflavin is first converted to a phosphoric acid ester by the action of various organisms before combination with proteins. Methods for the phosphorylation of flavines are known, and the publication of Kuhn and Rudy, Berichte 68B, 383–86 (1935) and their United States Patent 2,111,491, issued March 15, 1938, are exemplary of procedures employed previous to this time.

The process described by these investigators for the phosphorylation of flavines involves an esterification reaction between riboflavin and a phosphorous halide, oxyhalide, oxide, or metaphosphoric acid. Of primary consideration in carrying out the process is the presence of an organic base, such as pyridine, quinoline, triethylamine, and the like. When pyridine or a similar organic base is not used as the reaction medium, indifferent results are obtained from the process. In fact, in many instances, the ratio of organic base, such as pyridine, to the flavine being phosphorylated is as great as two thousand to one, and is usually greater than one thousand to one.

After cooling with ice, the mixture of pyridine and flavine is mixed with about one-half part by weight of specially distilled phosphorus oxychloride in about one hundred parts by weight of pyridine. After twenty hours at room temperature in the dark, the mixture is treated with a small quantity of sodium acetate while adding ice, evaporated to dryness in vacuo, and pyridine removed by adding a small quantity of water and distilling, this proceess being repeated several times. The residue is then dissolved in thirty thousand parts by weight of hot water, after which weakly ammoniacal silver nitrate solution is added to precipitate the silver salt of the flavine phosphoric acid. The precipitate is then washed with water, taken up in hot acetic acid, and decomposed with hydrogen sulfide after the addition of sodium acetate. The mixture is centrifuged, and the silver sulfide precipitate washed with warm water. The combined filtrate and washings are evaporated to dryness and the residue is dissolved in hot water, filtered and treated with an equal volume of hot alcohol. The sodium salt of the flavine phosphoric acid crystallizes from the alcoholic medium. The above procedure is typical of flavine phosphorylation reactions described in the prior art.

It is easily seen that a process of the type above-described leaves much to be desired. Such process is not only uneconomical because of the high ratio of organic base to the reacting flavine which is used, and which must be recovered in the interest of economy, but also because separation and recovery of the phosphorylated product is accomplished only with great difficulty. It is necessary in such processes to separate the phosphoric acid esters of flavines in the form of their silver salts and these are then decomposed with hydrogen sulfide in the presence of sodium acetate to form the sodium salt of the phosphorylated flavine. As a result this complicated process, only indifferent yields are obtained. It is apparent that a simple and economical process for preparing the sodium salt of a phosphorylated flavine is urgently desired and would be of great value.

I have now found that I may reduce the number of steps necessary to prepare phosphorylated flavines, and avoid completely the necessity of using an organic base as a reaction medium, and that I may prepare a fine microcrystalline powder of phosphorylated riboflavin in high yields, utilizing in the process an entirely new and simplified procedure.

According to the present invention, I react riboflavin and pyrophosphoric acid ($H_4P_2O_7$) directly under moderate conditions of temperature, and preferably with constant agitation, until such time as a test portion of the reaction mixture is completely soluble in about fifty parts of cold water. This usually requires from about 18 to about 30 hours, depending upon the temperature, the degree of agitation and other factors. Usually I prefer to maintain the temperature between about 20° and about 30° C. However, this temperature range represents the optimum for my reaction under the conditions employed, and the temperature may vary between about 15° and about 40° C. To facilitate handling of the reaction mixture, which tends to become very viscous during the course of the reaction, water-free orthophosphoric acid may be added as a diluent.

When a sample of the mixture is substantially completely soluble in about 50 parts of cold water, cold water is added gradually to the reaction mixture with constant stirring until the viscous mass is completely dispersed and a fluid mass is formed. Powdered sodium bicarbonate is then added portion wise and with stirring until the mixture is at a pH of between about 5.1 and about 6.1, preferably at about 5.5. The sodium salt of phosphorylated riboflavin is precipitated during the addition of sodium bicarbonate and can then be filtered off directly, washed with saturated aqueous sodium acetate, alcohol, and finally, if desired, with ether. The product may then be dried at about 40 degrees centigrade in vacuo.

The dried sodium salt of phosphorylated riboflavin is obtained in excellent yields as a fine, yellow microcrystalline powder which is soluble in water, almost insoluble in alcohol, and insoluble in ether. According to microbiological assay by the method of the United States Pharmacopoeia XII (U. S. P.) the sodium salt of phosphorylated riboflavin, prepared in accordance with the invention and sufficiently purified, contains the equivalent of at least 50 per cent of riboflavin, usually between about 65 and 75 per cent.

Of importance in carrying out my phosphorylation process is the employment of the proper phosphoric acid. I have found that pyrophosphoric acid may be used as above-described, and as further disclosed in the following examples. I have described the use of pyrophosphoric acid as a phosphorylating agent for riboflavin without the presence of an organic base, and such is of utmost importance, as I have found the process to be inoperative when such an organic base, e. g., pyridine, is present. Furthermore, I am specific in the limitation of the process to pyrophosphoric acid, inasmuch as the same appears to be singularly qualified to produce a flavine phosphorylation product having a high solubility and biological activity. Orthophosphoric acid has been utilized in an attempt to duplicate my results, both with and without the presence of an organic base, and has been found to have no utility in either case. At least 0.5 mol of pyrophosphoric acid is used for each mol of riboflavin, and usually from about one to about 8 mols, to insure as complete and rapid reaction of the riboflavin as possible. Any convenient proportion of orthophosphoric acid may be included in the reaction mixture to provide the desired degree of fluidity. Good results have been obtained using from about one to about twelve mols of substantially anhydrous orthophosphoric acid for each mol of riboflavin.

An advantage of my process is the possibility of reacting riboflavin and pyrophosphoric acid directly, eliminating the use of pyridine or other basic organic reaction medium and allowing the direct precipitation and recovery by filtration of the sodium salt of phosphorylated riboflavin in finely microcrystalline form without the use of complicated separation procedures. This provides a more economical and technically satisfactory process for the preparation of phosphorylated riboflavin and leads to an increase in the yield thereof based on the riboflavin used.

The phosphorylated riboflavin prepared by the method of the invention as previously set forth appears to be a disodium salt of diriboflavin pyrophosphoric ester having the empirical formula $$C_{34}H_{36}N_8O_{17}P_2Na_2 + 3H_2O$$

It may have the structural formula

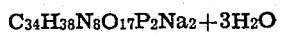
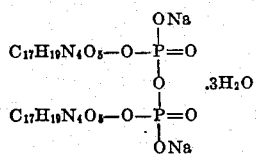

It is an orange-red solid soluble in about 50 times its weight of cold, distilled water to give a highly fluorescent solution and almost insoluble in ethanol and ether.

Inorganic phosphates can be removed from the crude product isolated from the reaction mixture by washing it thoroughly with a saturated aqueous solution of sodium acetate, then with alcohol to remove sodium acetate and drying, preferably in vacuo at 25° to 35° C. Assay of a representative sample of the purified product for riboflavin activity by the Microbiological Method of the U. S. P. shows the product to have an activity corresponding to about 55 per cent of riboflavin. Inasmuch as the riboflavin content of the compound, based upon the above postulated formula, is about 64 per cent, the riboflavin in the compound is about 86 per cent as active as pure riboflavin when measured by this method.

It is of further interest to note that when the assay was carried out omitting the acid hydrolysis step of the method, the microbiological response of the compound was only about 36 per cent, or only somewhat over half of that obtained when the hydrolysis step was included. When a sample of the product was submitted to acid hydrolysis, e. g. with aqueous hydrochloric, sulfuric, or orthophosphoric acid, and the product recovered and then tested as before, the omission of the acid hydrolysis step during the assay gave little or no difference in the results, the result being uniformly high in either case. It appears therefore that acid treatment of the product effects a change therein which leads to a higher degree of availability of the riboflavin in the compound. This change is thought to consist of a splitting of one molecule of the disodium salt of the diriboflavin ester of pyrophosphoric ester into two molecules of the monosodium salt of the monoriboflavin ester of orthophosphoric acid as follows:

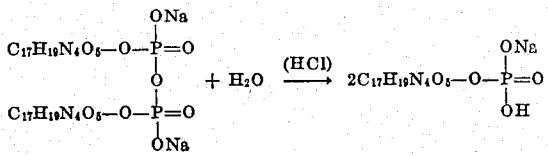

Inorganic phosphates are not formed during the acid hydrolysis. Potentiometric titration of the unhydrolyzed and hydrolyzed product with standardized hydrochloric acid solution gave equivalence points at the same pH in each case, i. e., at about 4.35 and about 8.2, but the amount of acid consumed between the equivalence points in the case of the hydrolyzed product was very nearly twice that consumed in the case of the same weight of unhydrolyzed product.

Certain advantages of the invention are apparent from the following examples which are given by way of illustration only and are not to be construed as limiting.

*Example 1*

A mixture of 11.9 grams (0.121 mol) of 100 per cent orthophosphoric acid and 3.1 grams (0.0174 mol) of pyrophosphoric acid was prepared and 3.76 grams (0.01 mol) of riboflavin was added in small portions over a period of one-half hour to the stirred mixture. Stirring was continued for twenty-four hours at 25° C. and then for four hours at 50° C. A test portion of the mixture was completely soluble in about 50 times its weight of cold water indicating that practically no unphosphorylated riboflavin remained. The mixture was then cooled to 25° C., 20 milliliters of anhydrous ethyl alcohol was added and after stirring for ten minutes, 80 milliliters of ether was added. The mixture was then centrifuged and the clear filtrate discarded. The filter cake was washed with an additional 80 milliliters of ether. The phosphorylated riboflavin remaining was stirred with 2.72 grams (0.02 mol) of crystallized sodium acetate and 35 milliliters of anhydrous ethyl alcohol to convert it to the sodium salt. The sodium salt was then precipitated by the addition of 80 milliliters of ether to the mixture and the resulting slurry centrifuged. The filter cake was washed with an additional 40 milliliters of ether and dried in vacuo at 25° C.

The dry, orange-yellow microcrystalline powder weighed 7.67 grams. It was soluble in about 50 times its weight of cold water. A portion of the sodium salt of the phosphorylated riboflavin was purified further by stirring it with a saturated solution of sodium acetate, filtering and washing the cake on the filter with additional saturated sodium acetate and then with anhydrous alcohol to remove excess sodium acetate solution. The washed product was substantially free of inorganic phosphates.

Example 2

A mixture of 1.6 grams (0.0163 mol) of orthophosphoric acid and 13.4 grams (0.0753 mol) of pyrophosphoric acid was stirred at 25° C. and 3.76 grams (0.01 mol) of riboflavin was added portionwise over a period of about one-half hour. Stirring was continued at 30° to 35° C. for an additional one and one-half hours. At test portion of the mixture was then found to be completely soluble in about 50 times its weight of cold water. The reaction mixture was cooled to 25° C. and stirred with 25 milliliters of ethyl alcohol until thoroughly mixed. About 60 milliliters of ether was then added, the mixture stirred thoroughly and centrifuged. The clear filtrate was discarded and the filter cake, consisting of phosphorylated riboflavin, was washed with 100 milliliters of ether. The washed cake was then mixed with 2.72 grams (0.02 mol) of crystallized sodium acetate to convert it to the sodium salt. The mixture was diluted with 60 milliliters of ether and centrifuged and the filter cake washed with 80 milliliters of ether to remove excess sodium acetate and acetic acid. The dry, orange-yellow microcrystalline powder weighed 6.45 grams. It was soluble in about 50 times its weight in cold water.

Example 3

Thirty grams (0.08 mol) of riboflavin was added in small portions over a period of one hour and with constant stirring at 20° C. to a mixture of 38.8 grams (0.396 mol) of orthophosphoric acid and 33.2 grams (0.187 mol) of pyrophosphoric acid. The mixture was stirred for 45 hours at 20° C. and 30 milliliters of alcohol was added with stirring over a period of fifteen minutes. Four hundred ninety-five milliliters of cold water was then stirred into the mixture over a period of twenty minutes. The mixture was cooled at from 25° to 30° C. during the addition of the alcohol in water. Powdered sodium bicarbonate was then stirred slowly into the mixture until a pH of 5.3 was attained, 78.3 grams (0.932 mol) of sodium bicarbonate being required. After stirring for an additional one-half hour at 25° C., the precipitated sodium salt of phosphorylated riboflavin was recovered by filtering and washed with 50 milliliters of saturated aqueous sodium acetate solution, then with about 300 milliliters of anhydrous ethyl alcohol and finally with about 200 milliliters of carbon tetrachloride and dried in vacuo at 40° C.

The dry, orange-yellow microcrystalline powder obtained weighed 32 grams. It was soluble in about 50 times its weight in cold water and when assayed according to the U. S. P. microbiological procedure was found to contain the equivalent of 56 per cent of its weight of riboflavin.

Example 4

To purify the orange-yellow powder obtained in Example 3, 18 grams of it was dissolved in 400 milliliters of water at 45° C. and the solution stirred with 5 grams of decolorizing carbon for ten minutes. The solution was then filtered, using a filter aid, and the filtrate extracted first with 130 milliliters and then with 70 milliliters of benzyl alcohol to remove any traces of unphosphorylated riboflavin. The extracted aqueous solution was then concentrated in vacuo to about 150 milliliters and 375 milliliters of anhydrous ethyl alcohol added. After standing at room temperature for 48 hours, the fine, orange colored precipitate which had formed was recovered by filtering, and washing with anhydrous ethyl alcohol and dried at 45° C. The purified product was soluble in about 50 times its weight of cold water to form a clear, yellow-orange fluorescent solution.

A sample of the purified product was dried in vacuo at 100° C. over phosphorus pentoxide. The sample lost 8.6 per cent of its weight. There was no additional loss in weight when the sample was dried further in vacuo at 135° C. over phosphorus pentoxide. The product which had been dried over phosphorus pentoxide was analyzed and found to correspond to disodium diriboflavin pyrophosphoric ester Anal.—Calc'd for $C_{34}H_{44}N_8O_{20}P_2Na_2$: C, 41.1; H, 4.47; N, 11.29; P, 6.24. Found: C, 40.97; H, 4.59; N, 11.31; P, 6.17.

The product which had been dried over pentoxide was assayed by the U. S. P. microbiological procedure and was found to give a microbiological response equivalent to 55 per cent of riboflavin.

When the acid hydrolysis step of the U. S. P. microbiological procedure was omitted, the product gave a microbiological response equivalent to 36 per cent of riboflavin.

A solution of 0.3 gram of the purified product in 50 milliliters of water was found to have a pH of 7.8. When this solution was titrated potentiometrically, equivalence points were found at pH 4.35 and pH 8.20. The form of the titration curve showed clearly that the product titrated was a monobasic ester.

A sample of the purified product was heated at 120° C. for one-half hour with 0.1 normal hydrochloric acid and after recovering and purifying as before titrated potentiometrically. The equivalence points remained unchanged but the amount of standard solution consumed between the equivalence points was twice that consumed in the titration before hydrolysis. Inorganic phosphates were absent both in the original product and in the solution from the acid hydrolysis. The equivalence points in neither case corresponded to those for either orthophosphoric or pyrophosphoric acid.

Example 5

Thirty-five grams of the crude disodium salt of diriboflavin pyrophopshoric ester obtained as in Example 3 was dissolved in a solution of 35 milliliters of concentrated hydrochloric acid in 500 milliliters of water and heated at 90° C. for 45 minutes. The solution was then cooled to 25° C., diluted with 1500 milliliters of water and 10 milliliters of glacial acetic acid added and the pH of the mixture adjusted to 6.8 by the careful addition of concentrated sodium hydroxide solution. The mixture was centrifuged and the solids obtained were set aside. The clear filtrate was evaporated in vacuo at 50° to 60° C. to a volume of 20° milliliters and poured while warm into 800 milliliters of 95 per cent alcohol. After standing overnight, the precipitate which formed was recovered by filtering and washing with anhydrous alcohol and then with ether and drying in vacuo at 40° C. The orange colored powder obtained weighed 14.4 grams and was soluble in somewhat less than 50 times its weight of cold water. After drying in vacuo at 100° C. over phosphorus pentoxide the product was found to have a phosphorus content of 6.25 per cent. The theoretical value for the phosphorus content of the disodium salt of riboflavin orthophosphoric ester is 6.19 per cent.

A sample of the product prepared as described above was titrated potentiometrically and equivalence points were found at pH 4.35 and pH 8.2. A sample of the product assayed by the U. S. P. microbiological procedure gave a microbiological response of the product equivalent to 57 per cent of riboflavin. This value was unchanged regardless of whether the acid hydrolysis step of the method was included or omitted.

I claim:

1. The process which comprises reacting riboflavin and pyrophosphoric acid in an acidic medium to form a phosphorylated riboflavin.

2. The process which comprises contacting riboflavin and pyrophosphoric acid in an acidic medium and separating a phosphorylated riboflavin from the reaction product.

3. The process which comprises agitating a mixture of riboflavin and pyrophosphoric acid at a temperature below about 40° centigrade in an acidic medium.

4. The process which comprises reacting riboflavin and pyrophosphoric acid in an acidic medium while heating and agitating the reaction mixture.

5. The process which comprises reacting riboflavin and pyrophosphoric acid at a temperature between about 15° and about 40° centigrade in an acidic medium.

6. The process which comprises contacting riboflavin and pyrophosphoric acid, in an acidic medium, at a temperature between about 15° and about 40° centigrade until a test portion of the reaction mixture is soluble in about 50 parts of cold water.

7. The process which comprises contacting riboflavin and pyrophosphoric acid in an acidic medium at a temperature between about 15° and about 40° centigrade, diluting the reaction mixture, adding a sodium salt, and precipitating a sodium salt of a phosphorylated riboflavin therefrom at a pH of between about 5.1 and about 6.1.

8. The process which comprises contacting riboflavin and pyrophosphoric acid in an acidic medium at a temperature between about 15° and about 40° centigrade, diluting the reaction mixture and adding sodium bicarbonate thereto until a pH of about 5.5 is attained in the reaction mixture.

9. The process which includes reacting riboflavin and pyrophosphoric acid in an acidic medium at a temperature between about 15° and about 40° centigrade, diluting the reaction mixture with water, adding sodium bicarbonate to a pH of between about 5.1 and about 6.1, and separating the sodium salt of phosphorylated riboflavin.

10. The process which includes reacting riboflavin and pyrophosphoric acid in an acidic medium at a temperature between about 20° and about 30° centigrade, diluting the reaction mixture, adding sodium bicarbonate to a pH of about 5.5, and separating the sodium salt of phosphorylated riboflavin.

11. The process which includes reacting riboflavin and pyrophosphoric acid in substantially anhydrous orthophosphoric acid as a reaction medium.

12. The process which includes contacting riboflavin and pyrophosphoric acid in an acidic medium, separating a phosphorylated riboflavin from the reacted mixture, and hydrolyzing the phosphorylated riboflavin with the aid of an aqueous mineral acid.

13. The method which includes heating a mixture comprising riboflavin and pyrophosphoric acid in an acidic medium at a temperature below about 40° centigrade to form a phosphorylated riboflavin and subsequently hydrolyzing the phosphorylated riboflavin with an aqueous mineral acid.

14. Diriboflavin pyrophosphoric ester.

15. A disodium salt of diriboflavin pyrophosphoric ester.

16. A compound selected from the group consisting of diriboflavin pyrophosphoric acid ester and the disodium salt thereof.

PHILIP J. BREIVOGEL.

REFERENCES CITED

The following references are of record in the file of this patent:

UNITED STATES PATENTS

| Number | Name | Date |
| --- | --- | --- |
| 2,111,491 | Kuhn et al. | Mar. 15, 1938 |
| 2,449,003 | Moos et al. | Sept. 7, 1948 |

OTHER REFERENCES

Booher: Chemistry and Ind., September 19, 1942, page 390, 1 page.